Patented Aug. 14, 1923.

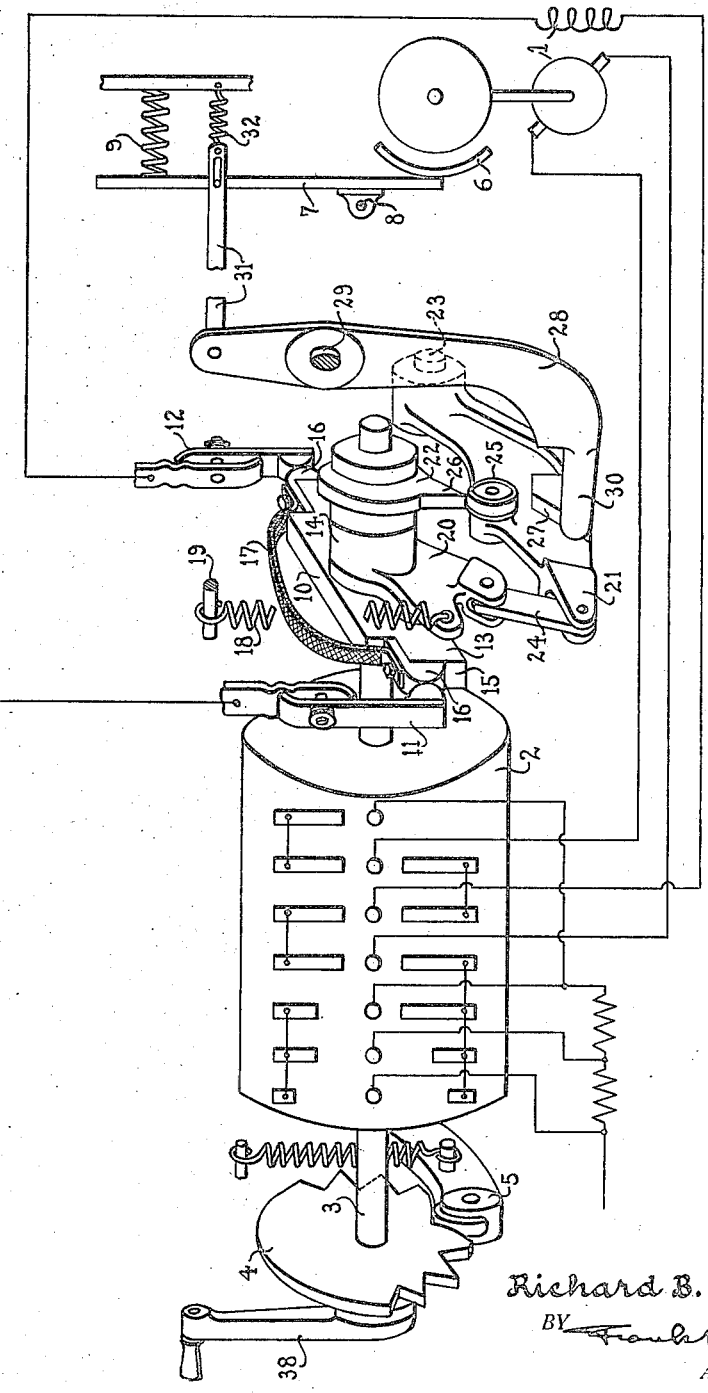

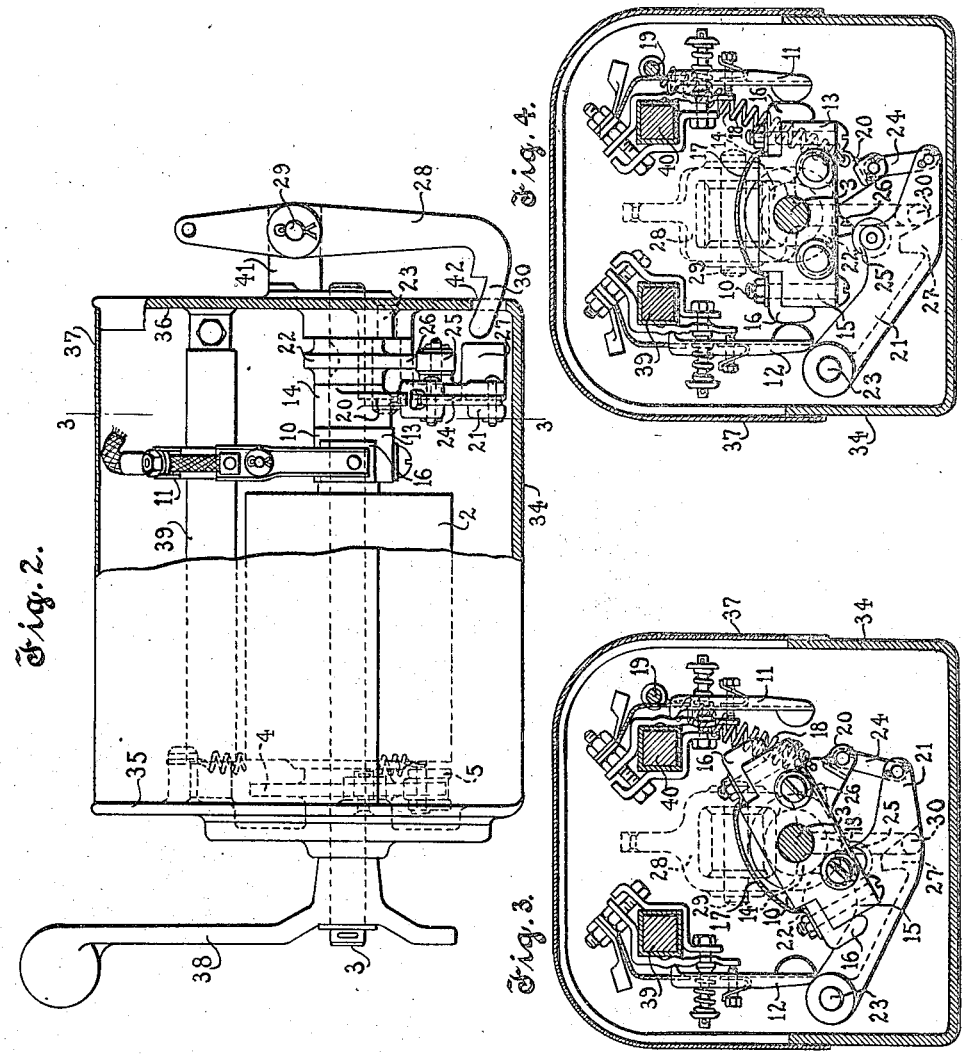

1,464,712

UNITED STATES PATENT OFFICE.

RICHARD B. HUNTER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed March 31, 1921. Serial No. 457,204.

*To all whom it may concern:*

Be it known that I, RICHARD B. HUNTER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to controllers for electric motors and while not limited thereto is particularly applicable to the control of motors operating industrial trucks and the like.

Such controllers are usually provided with a safety switch for interrupting the motor circuit, said switch being so interlocked with the speed controller and the braking means as to insure opening thereof upon setting of the brake and to prevent closure thereof until after release of the brake and movement of the controller to off position.

The present invention has among its objects to provide a controller of the aforesaid character having a safety switch provided with improved interlocking means which is simple and compact in construction and efficient in operation.

Another object is to provide a controller of the aforesaid character wherein the safety switch closes automatically upon movement of the controller into off position and necessitates release of the brake to maintain the same in closed position upon movement of the controller into any of its operative positions.

Another object is to provide a controller of the aforesaid character wherein the operative force required is reduced to a minimum, thereby minimizing the tendency to overthrow in moving to on positions.

Other objects and advantages will hereinafter appear.

The accompanying drawings illustrate an embodiment of the invention which will now be described, it being understood that the apparatus illustrated is capable of modifications falling within the scope of the appended claims.

In the drawing,

Fig. 1 is a schematic view of a controller embodying the invention;

Fig. 2 is a side elevational view partly in section of a mechanical embodiment of the controller illustrated in Fig. 1;

Figs. 3 and 4 are sectional views on line 3—3 of Fig. 2 illustrating the safety switch in different operative positions.

Referring to Fig. 1, the same illustrates a reversible electric motor 1 of the type ordinarily employed in truck service and a drum controller 2 to effect starting, stopping and reversal of the motor and acceleration thereof in either direction through resistance variation in the usual manner. Said controller is mounted upon a shaft 3 having a star wheel 4 fixed thereto to be engaged by a spring pressed pawl 5 and is movable in opposite directions from an intermediate off position to effect starting of the motor with the entire resistance in circuit. The motor is also provided with a mechanically operated brake 6 having an operating lever 7, fulcrumed at 8 and being in practice integral with or connected to a section of the operator's platform of the truck whereby the weight of the operator when standing on said platform serves to hold the brake released against the action of a spring 9.

The controller also includes a safety switch 10 for controlling the power circuit of motor 1, said switch having operating means to be hereinafter described in detail for subjecting the same to operation and control by said drum controller and said brake jointly, said switch and the operating means therefor coacting to insure the aforestated co-ordinated action of said drum controller and said brake.

The safety switch 10 comprises a pair of stationary contact fingers 11 and 12 adapted to be bridged by a movable contactor 13 which is rigidly secured to a supporting member 14 rotatable on shaft 3. The stationary contact fingers 11 and 12 are of a conventional type and the movable contactor 13 includes an insulated supporting member 15, having contacts 16 secured to opposite ends thereof, said contacts being connected by a lead 17. Movable contactor 13 is biased to open position by a spring 18 having its upper end secured to a fixed pin 19 and its lower end secured to a downwardly projecting arm 20 on supporting member 14 and the same is movable to closed position through the medium of a lever 21 to be actuated by a cam 22. Lever 21 is pivotally mounted on a fixed pin 23 and has its free end pivotally connected to the free end of arm 20 by a link 24. Lever 21 carries a roller 25 to be engaged by cam 22 and said cam is fixed to shaft 3 and is provided with a peak 26.

The aforedescribed operating parts for safety switch 10 are so designed and proportioned that when controller 2 is moved into off position peak 26 of cam 22 engages roller 25 to maintain lever 21 in a position wherein the movable contactor 13 bridges stationary contacts 11 and 12, as shown in Fig. 4. Upon movement of controller 2 in either direction out of off position peak 26 of cam 22 moves out of engagement with roller 25 and the movable contactor 13 is then free to move to the open position shown in Fig. 3 under the action of spring 18 such opening movement being limited by engagement of roller 25 with the rounded face of said cam.

To prevent opening of safety switch 10 upon movement of controller 2 out of off position lever 21 is provided with a projecting shoulder 27 to be engaged by a latch 28, in closed position of said switch. Latch 28 is pivoted intermediate its ends on a fixed pin 29, and the lower end thereof is provided with a curved locking portion 30 for engaging shoulder 27. The upper end of latch 28 is operatively connected to brake lever 7 by a link 31 and the arrangement is such that when the brake lever 7 is moved to releasing position latch 28 is free to move into locking position under the action of a spring 32.

From the foregoing it is apparent that with the drum controller 2 in off position and brake 6 released, latch 28 serves to hold the safety switch 10 in closed position upon movement of the drum controller 2 in either direction out of off position. However, if the brake is set, latch 28 is moved out of the path of shoulder 27 and upon movement of drum controller 2 out of off position safety switch 10 immediately moves to open position under the action of spring 18. Further, it is apparent that with controller 2 in any of its operative positions upon setting of the brake 6, latch 28 is moved out of engagement with shoulder 27 and the safety switch 10 immediately moves to open position with a snap action under the action of spring 18. Upon return of controller 2 to off position, safety switch 10 is returned to closed position and it should be noted that during movement of the controller into off position the centering action of pawl 5 on star wheel 4 assists in effecting closure of said switch. Thus it is apparent that by properly proportioning the spring pressure on pawl 5 and the strength of spring 18 it is possible to provide for closure of the safety switch without any appreciable additional load on the controller during movement thereof into closed position.

Figs. 2 to 4 illustrate certain details of the device as constructed in practice, the aforedescribed controller parts being supported in operative relation by a cast metal frame 34 having end walls 35 and 36. Said end walls carry a sheet metal enclosing cover 37 therebetween and shaft 3 is supported in bearings in said walls and is provided with an operating handle 38. Also said end walls carry parallel insulating supporting members 39 and 40 therebetween for supporting the stationary contact fingers of controller 2 and contact fingers 11 and 12 of safety switch 10. As shown in Fig. 2, end wall 36 is provided with a projecting lug 41 on the outer face thereof for receiving pivot pin 29 of latch 28 and the same is provided with an opening 42 for receiving the curved locking portion 30 of said latch. End wall 32 also forms a support for supporting pin 19 of spring 18 and the pivot pin 23 of lever 21.

What I claim as new and desire to secure by Letters Patent is:

1. In a controller for an electric motor, the combination with a brake element and a circuit controlling device for the motor, of a switch controlling the line connection of the motor, said switch being biased to open position, means providing for closure of said switch upon movement of said device into a given position and for permitting opening thereof upon movement of said device out of such position and means associated with said element for locking said switch in closed position independently of said device and for releasing the same upon given operations of said element.

2. In a controller for an electric motor, the combination with a mechanically operated safety device and a circuit controlling device for the motor, of a switch controlling the line connection of the motor, said switch being biased to open position and being closed by said circuit controlling device upon movement thereof into a given position, and means associated with said safety device for locking said switch in closed position independently of said device and for releasing the same upon given operations of said safety device.

3. In a controller for an electric motor, the combination with a mechanical brake and a drum controller for said motor, said brake being operable independently of said drum controller, of a switch in the circuit of said motor, operating means for said switch associated with said drum to effect closure thereof upon movement of said drum into a given position and tending to open the same upon movement of said drum out of such position and means associated with said brake for locking said switch in closed position upon release of said brake and for releasing the same upon setting of said brake.

4. In a controller for an electric motor, the combination with a mechanically operated brake and a circuit controlling drum, said brake and said drum controller being operable independently of one another of a line switch in circuit with said motor and said drum, said switch being biased to open position, means insuring closure of said switch upon movement of said drum into a predetermined position and permitting opening thereof upon movement of said drum out of said position and means for locking said switch in closed position upon release of said brake, and for releasing said switch upon setting of said brake.

5. In a controller for an electric motor, the combination with a mechanically operated brake for the motor and a drum controller interposed between the motor and the line and positionable for stopping the motor and starting thereof in either direction, of a switch controlling the line connection of said motor, said switch being biased to open position, means for effecting closure of said switch upon movement of said drum controller into off position and for permitting opening thereof upon movement of said drum controller into either of its starting positions and means for locking said switch in closed position and operable upon setting of said brake to release said switch.

6. In a controller for an electric motor, the combination with a mechanically operated brake for the motor, a drum controller interposed between the motor and the line and movable in opposite directions from an off position to effect starting of the motor in either direction under resistance protection, of a line switch in circuit with said drum controller, said switch tending to open upon movement of said drum controlled in either direction from off position and being closable by said drum controller upon movement thereof into off position, and interlocking means between said switch and said brake for locking said switch in closed position upon release of said brake and for permitting opening of said switch upon setting of said brake.

7. In a controller for an electric motor, the combination with a mechanically operated brake for the motor and a drum controller interposed between the motor and the line and movable in opposite directions from off position to effect starting of the motor in either direction under resistance protection, of a line switch in circuit with said motor, said switch being biased to open position, means insuring closure of said switch upon movement of said drum controller into off position and means associated with said brake for restraining said switch in closed position upon release of said brake and for effecting opening thereof upon setting of said brake.

8. In a controller for an electric motor, the combination with a mechanically operated brake for the motor and a drum controller interposed between the motor and the line of a line switch in circuit with said motor, said switch being biased to open position, a cam associated with said drum controller for effecting closure of said switch upon movemetn of said drum controller into a pre-determined position and for permitting opening of said switch upon movement of said drum controller out of such position and a latch associated with said switch for locking the same in closed position upon movement of said drum controller out of said pre-determined position, said latch being releasable upon setting of said brake.

9. In a controller for an electric motor, the combination with a mechanically operated brake for the motor and a drum controller interposed between the motor and the line, of a switch controlling the line connection of said motor, said switch being biased to open position, a pivoted operating lever for said switch, a cam for actuating said lever to effect closure of said switch upon movement of said drum controller into a pre-determined position and for permitting opening of said switch upon movement of said controller out of such position and a latch movable into the path of said lever to lock the same in a position wherein said switch is closed, said latch being releasable by said brake upon setting thereof.

10. In a controller for an electric motor, the combination with a mechanically operated brake for the motor and a circuit controller therefor of a switch controlling the line connection of said motor, said switch including oppositely disposed stationary contacts and a movable bridging contact therebetween, a spring biasing said movable bridging contact out of engagement with said stationary contacts, a cam operable by said circuit controller to close said switch upon movement of said controller into off position and to permit opening thereof upon movement of said controller out of said position and a latch for restraining said switch in closed position, said latch being operable by said brake upon setting of the latter to permit opening of said switch.

In witness whereof, I have hereunto subscribed my name.

RICHARD B. HUNTER.